United States Patent

[11] 3,586,764

[72] Inventors Max H. Diehl
Manlius;
Halfon N. Hamaoui, Fayetteville, both of, N.Y.
[21] Appl. No. 802,003
[22] Filed Feb. 25, 1969
[45] Patented June 22, 1971
[73] Assignee General Electric Company

[54] T.V. CAMERA SYSTEM EMPLOYING A LUMINANCE PICKUP TUBE AND A COLOR PICKUP TUBE FOR MULTIPLEXED RED AND BLUE SIGNALS
5 Claims, 9 Drawing Figs.

[52] U.S. Cl. .......... 178/5.4 ST
[51] Int. Cl. .......... H04m 9/08
[50] Field of Search .......... 178/5.4 ST, 5.4, 5.2

[56] References Cited
UNITED STATES PATENTS

| | | | |
|---|---|---|---|
| 2,603,706 | 7/1952 | Sleeper, Jr. | 178/5.4 STC |
| 2,983,784 | 5/1961 | Razdow | 178/5.4 STC |
| 3,496,286 | 2/1970 | Chmillon | 178/5.4 |

*Primary Examiner*—Robert L. Griffin
*Assistant Examiner*—Donald E. Stout
*Attorneys*—W. Joseph Shanley, Frank L. Neuhauser, Oscar B. Waddell and Marvin Snyder

ABSTRACT: A color television camera system and method using one luminance pickup tube and one color pickup tube. An input image beam is split between the luminance tube and the optics for the color pickup tube. The color portion of the input beam is split in a Kosters prism to provide two output beams, one of which is inverted relative to the input beam. The output beams form two side-by-side images on the color tube. A video scan line sequentially covers one of the two images in a forward direction and the other in a reverse direction to generate a line-sequential video signal. A sequencer receives this video signal and provides continuous output video signals representing two colors.

INVENTORS
MAX H. DIEHL
HALFON N. HAMAOUI
BY Thomas A. Briody
ATTORNEY

INVENTORS
MAX H. DIEHL
HALFON N. HAMAOUI

BY Thomas A. Briody
ATTORNEY

T.V. CAMERA SYSTEM EMPLOYING A LUMINANCE PICKUP TUBE AND A COLOR PICKUP TUBE FOR MULTIPLEXED RED AND BLUE SIGNALS

BACKGROUND OF THE INVENTION

1. Field of the Invention

This invention relates to a color television camera system and method, and more particularly to a system and method for providing signals corresponding to two colors in a line-sequential pattern.

2. Description of the Prior Art

Color television cameras in the prior art typically provide a red (R) image, a blue (B) image and a white (Y) image, although other color combinations are also used. These three images are typically picked up by three separate pickup tubes to provide video signals corresponding respectively to the images of the three different colors (R, B, and Y).

One prior art system, as disclosed in U.S. Pat. No. 2,641,642 (Behrend), uses only two separate pickup tubes. One of the tubes picks up the Y image, and one is faced with a vertical-strip color filter which isolates from successive increments of a scan line their respective individual color components. Such a prior art system has a very poor signal-to-noise ratio, thereby resulting in poor sensitivity of the camera.

SUMMARY OF THE INVENTION

The invention is an improved color television camera system and method in which images of two different colors are placed in side-by-side areas of a first pickup tube. The image of one color is the mirror image of the other (noninverted) image. The images are scanned such that the noninverted image is first scanned in a first direction, and the mirror image is then scanned in the opposite direction. The inversion and reverse scanning of an image compensates for errors in yoke geometry by balancing them out.

A simple sequencer circuit is used to convert the output of this image pickup tube to two continuous output signals respectively corresponding to the two images.

A second pickup tube provides a video signal corresponding to the white (or luminance) Y image. Thus, two tubes provide continuous R, B, and Y output signals.

DESCRIPTION OF THE PREFERRED EMBODIMENT

Figures 1, 2A, 2B:
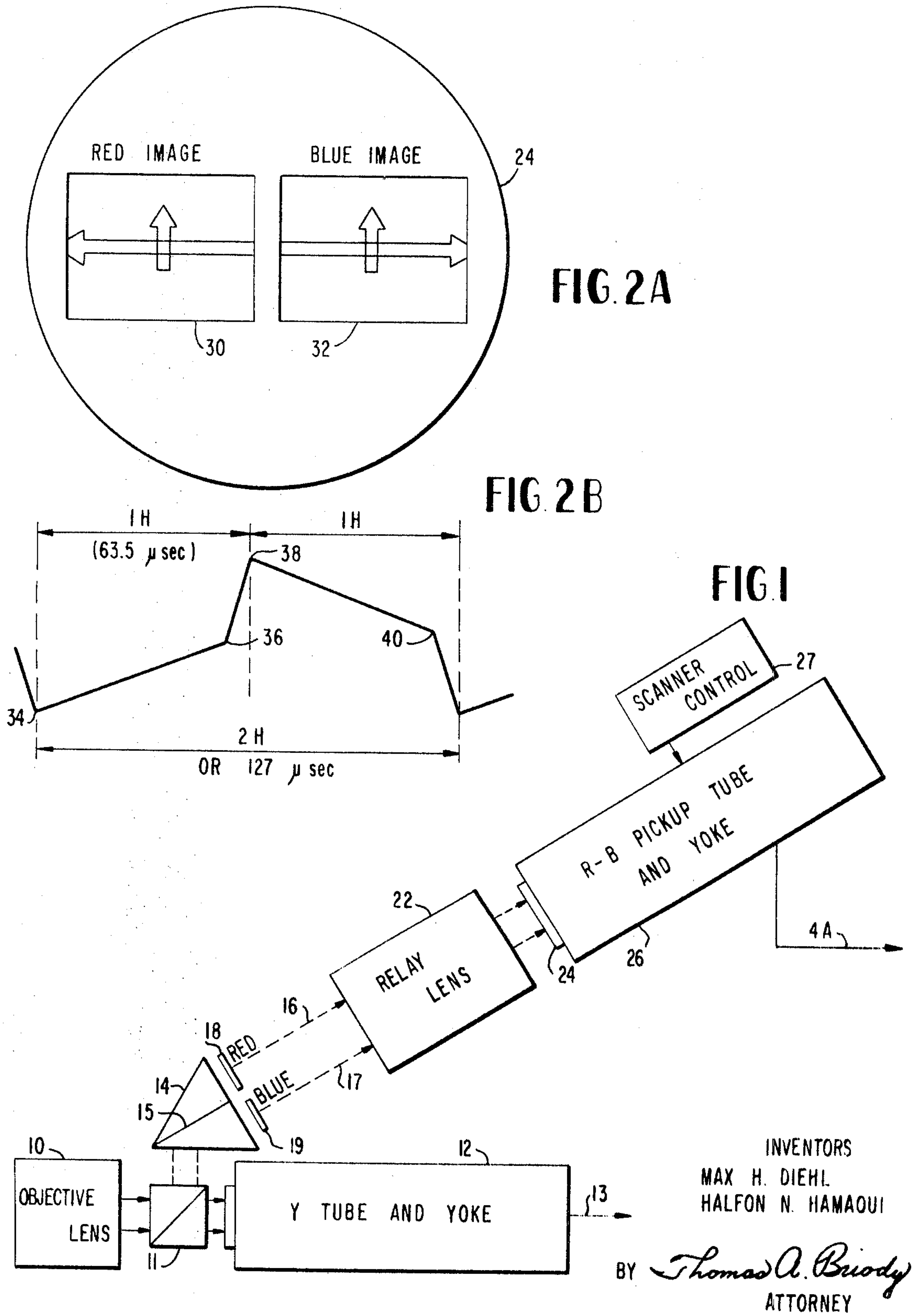
FIG. 1 is a block diagram of a lens and pickup tube system for use in the present invention.
FIG. 2A is a schematic diagram illustrating the placement of two optical images on the face of a pickup tube.
FIG. 2B is a diagram of the horizontal sweep signal used to sweep the images in FIG. 2A.

In FIG. 1 light picked up by the television camera from a scene to be photographed passes through an objective lens 10 into a conventional beam splitter prism 11. Part of the light from prism 11 falls on the face of a Y pickup tube and yoke 12 which generates a luminance output signal on line 13.

The other part of the light from prism 11 falls on a Kosters prism 14 which is split into two sections along its center plane 15. The Kosters prism splits the image-bearing beam from prism 11 into two separate image-bearing beams 16 and 17. One of the beams contains a noninverted image and the other beam contains an inverted or mirror image. As illustrated, beam 16 passes through a red filter 18, and beam 17 passes through a blue filter 19, thereby emphasizing the red and blue color components of the image. Alternatively, filters 18 and 19 can be omitted, and a dichroic coating can be placed in plane 15 of the Kosters prism to discriminate between the red and blue components. A description of Kosters prisms may be Found, inter alia, in Appendix C by J. B. Saunders on pages 393—399 of Strong, *Concepts of Classical Objects* (W. H. Freeman and Company, 1958), as well as in articles by J. B. Saunders in Volume 58, No. 1 of Jan. 1957 *Journal of Research of the National Bureau of Standards*, pages 21—26, (Research Paper 2729) and Volume 67C, No. 3 of the July—Sept. 1963 *Journal of Research of the National Bureau of Standards —C. Engineering and Instrumentation, pages* 201—205 (Paper 67C3—130).

Beams 16 and 17 enter a relay lens 22 which reduces the images in size and focuses them on the face 24 of an R–B pickup tube and yoke 26. A scanner control 27 operates to scan the tube. The output video signal from tube and yoke 26 is provided on a line 4A.

FIG. 2A is a diagram illustrating the placement of the images carried by beams 16 and 17 on the face 24 of tube 26. The images are placed side-by-side in separate areas 30 and 32 of face 24. One of the images is the mirror image of the other.

FIG. 2B is a diagram of a waveform used by scanner control 27 for horizontally scanning the images in areas 30 and 32. The waveform begins at a low amplitude at point 34, corresponding for example to the left edge of area 30. The waveform rises to an intermediate amplitude at a point 36, corresponding to the right edge of area 30. Thus, area 30 has been scanned from left to right, in this example, between points 34 and 36 of the waveform.

It is then desired to scan area 32 from right to left, to reverse the mirror effect. So the waveform is rapidly increased in amplitude to a point 38, corresponding to the right edge of area 32. The waveform is then decreased in amplitude to another intermediate value at point 40, corresponding to the left edge of area 32. Thus, area 32 has been scanned from right to left between points 38 and 40 of the waveform.

The waveform of FIG. 2B reoccurs at a fundamental frequency of 1/2H (c.p.s.), where H is the period of a line in the field used (63.5 $\mu$sec. in the standard U.S. broadcast system). The reversal of one image on face 24 is an inherent result of using a Kosters prism as a beam splitter. The scan waveform used has an unusual shape because of the need for reversing scan direction in the middle of the scan. Such a waveform can be generated by a variable waveform generator, as well as by other circuits obvious to a skilled artisan after an examination of the desired waveform.

Reversal of the scan has an added advantage in that it compensates for errors of symmetry in the yoke. With the reversed images, shading errors appear on the same side of each image, thereby permitting less complicated waveforms to be used for correction of these errors, and facilitating registration of the red and blue signals.

Figure 3:
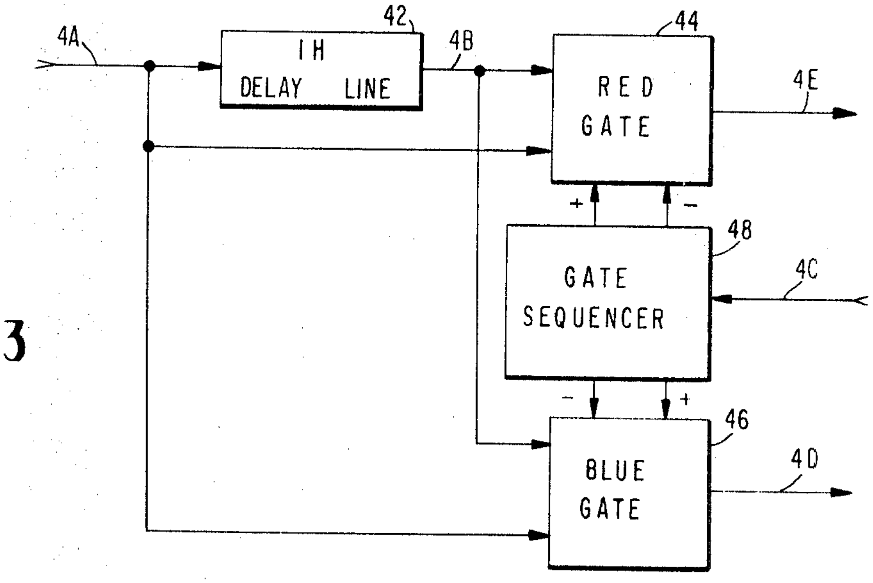
Fig. 3 is a block diagram of a sequencer for generating two continuous video output signals from the line-sequential video signal derived from the R–B pickup tube of Fig. 1.

FIG. 3 is a block diagram of a sequencer designed to take the line-sequential video output of the R–B pickup tube from line 4A and to generate a continuous R video output and a continuous B video output.

FIGS. 4A through 4E are diagrams of various waveform occurring in the operation of the device of FIG. 3.

Figures 4A, 4B, 4C, 4D, 4E:
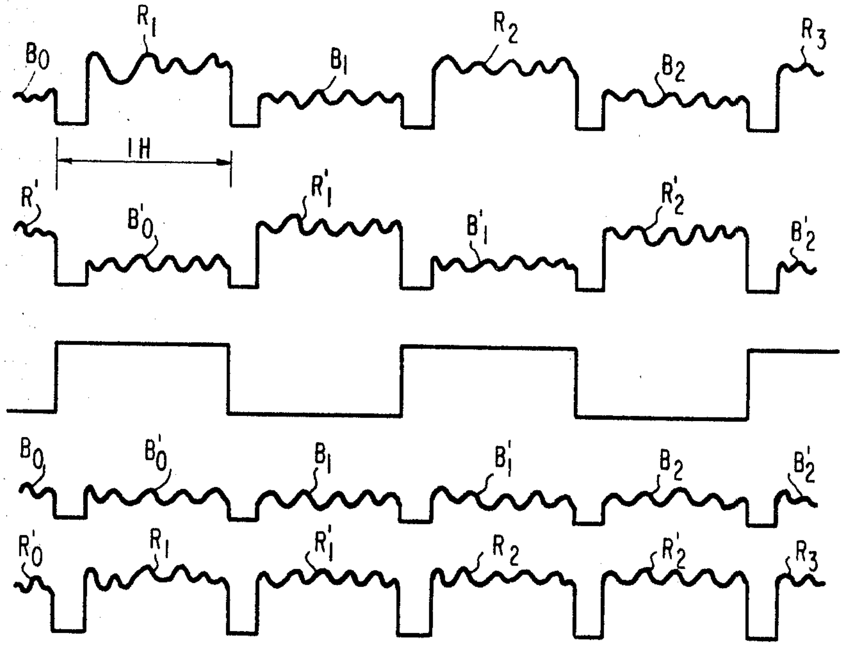
FIGS. 4A—4E represent waveforms occurring at various indicated points in the sequencer circuit of FIG. 3.

The signal on line 4A from tube 26, and occurring at the input of the circuit of FIG. 3, is illustrated in FIG. 4A. Assume that, in the particular image involved, there is more red than blue. Therefore, the red line increments of the video signal, labeled $R_0$, $R_1$, $R_2$, etc., are of greater amplitude than the blue line increments, labeled $B_0$, $B_1$, $B_2$, etc.

The video signal on line 4A is applied to a 1H delay line 42 to generate a delayed video signal on line 4B, as illustrated in FIG. 4B. Each delayed increment, labeled $R'_0$, $B'_0$, $R'_1$, $B'_1$, $R'_2$, etc., is a delayed version of the correspondingly labeled (nonprimed) increments.

Both the delayed signal on line 4B and the nondelayed signal on line 4A are applied to a "red" gate 44 and a "blue" gate 46. These gates are operated by gate sequencer 48, such that when red gate 44 connects the delayed signal to its output line 4E, blue gate 46 connects the undelayed signal to its output line 4D and vice versa, thereby generating the respective signals shown in FIGS. 4E and 4D. The gate sequencer is synchronized by a signal on line 4C as shown in FIG. 4C (e.g. at a rate of 1/2H c.p.s.).

Thus, the signals on lines 4D and 4E are respectively continuous blue and red video output signals.

Because there are 262 1/2 lines in a raster, there are 262 1/2 lines in a frame as picked up by tube 26. Any division of this number by an integer will result in a slow vertical crawl if uncorrected. Accordingly, a V or vertical rate pulse is used to reset the gate sequencer once each field, by resetting the incoming signal on line 4C.

This system reduces the resolution of the R and B signals. However, it has been found that the eye easily accepts reduced R and B resolution, provided the Y resolution is kept high.

It is also possible to scan both areas of the tube at twice the customary frequency, and then use line stretching techniques to slow the time base down to a useful real time, thereby maintaining full vertical resolution.

It has been experimentally found that, when scanning with a raster of 262 1/2 rather than 525 lines per frame, almost twice the peak signal current is obtained, thereby improving the signal to noise ratio significantly. Therefore, camera sensitivity is increased with the present system.

While the invention has been disclosed in terms of R, B, and Y components, other colors such as red, blue, and green can also be used.

While the invention has been particularly shown and described with reference to a preferred embodiment thereof, it will be understood by those skilled in the art that various changes in form and details may be made therein without departing from the spirit and scope of the invention.

What we claim as new and desire to secure by Letters Patent of the Unites States is:

1. A color television camera system comprising:
   a. means for receiving an input image beam of light and for separating the input beam into a first image beam and a second image beam, said second image beam being inverted with respect to said first image beam,
   b. means for emphasizing a first color in the first beam and for emphasizing a second color in the second beam,
   c. a pickup unit, including a single face means, for receiving said first image beam and said second image beam in two side-by-side areas of said face, and
   d. means for deriving a video output signal from said face by repetitively first scanning a first one of said two areas in one direction and then scanning the other one of said two areas in the opposite direction.

2 A system according to claim 1 wherein:
   a. said receiving means further comprises multielement prism means for separating said input beam, and
   b. said emphasizing means further comprises a dichroic coating between the elements of said prism means.

3. A system according to claim 1 further comprising:
   a. means responsive to said video output signal for deriving a delayed video signal corresponding to said video output signal delayed by the amount of time between the beginning of the scanning of one of said two areas and the beginning of the scanning of the next one of said two areas, and
   b. gating means responsive to said video output signal and to said delayed video signal for deriving a first continuous signal corresponding to said first color and for deriving a second continuous signal corresponding to said second color.

4. A system according to claim 3 further comprising a second pickup unit for receiving said input image beam and for generating a luminance signal in response thereto.

5. A method of sequencing video signals representing related images of different colors comprising:
   a. generating first and second image beams of light respectively carrying first and second images,
   b. directing both said image beams at a single face of a single pickup tube to form said first and second images side-by-side on said face in such a manner that one image is inverted with respect to the other image, and
   c. scanning said face by scanning said images sequentially to generate a single video output signal containing, in successive separate portions of the signal, video information from said images sequentially.